United States Patent [19]

Sander et al.

[11] Patent Number: 4,974,951
[45] Date of Patent: Dec. 4, 1990

[54] SURGICAL MICROSCOPE WITH RAPID FOCAL-LENGTH CHANGER

[75] Inventors: Ulrich Sander; Kurt Schulz, both of Oberkochen, Fed. Rep. of Germany

[73] Assignee: Carl Zeiss, Oberkochen, Fed. Rep. of Germany

[21] Appl. No.: 409,883

[22] Filed: Sep. 20, 1989

[30] Foreign Application Priority Data

Sep. 26, 1988 [DE] Fed. Rep. of Germany ... 8812148[U]

[51] Int. Cl.$^5$ ............................ G02B 7/02; G02B 3/00
[52] U.S. Cl. .................................... 350/520; 350/256; 350/409
[58] Field of Search .............. 350/520, 527, 519, 502, 350/510, 516, 247, 254, 256, 409; 351/212, 237

[56] References Cited

U.S. PATENT DOCUMENTS 1,717,755  6/1929  Brady ............................... 350/256
4,448,498  5/1984  Muller et al. ..................... 350/447

*Primary Examiner*—Bruce Y. Arnold
*Assistant Examiner*—James Phan
*Attorney, Agent, or Firm*—Hopgood, Calimafde, Kalil, Blaustein & Judlowe

[57] ABSTRACT

The invention contemplates a stereoscopic binocular surgical microscope wherein a principal objective of defined focal length is rigidly attached to the microscope and serves both observation-ray paths; an additional lens system is swingably positionable in and out of the ray paths for quick change of focal length, without changing the principal objective, and the additional lens system has provision for selective small radial adjustment of the axis of the additional lens system with respect to the axis of the principal objective, when in operative position.

4 Claims, 1 Drawing Sheet

SURGICAL MICROSCOPE WITH RAPID FOCAL-LENGTH CHANGER

BACKGROUND OF THE INVENTION

The present invention relates to a stereoscopic binocular surgical microscope which has a principal objective of defined focal length, wherein the principal objective is common to the two stereoscopic observation-ray paths and is rigidly attached to the microscope.

Known surgical microscopes have objective changers which are developed in accordance with the turret principle and which receive two or more objectives of defined focal length. The disadvantage of these known instruments is the occurrence of disturbing reflections which degrade contrast in the field of view.

Instruments with individually replaceable objectives are also known but have the disadvantage that the inner optical system of the microscope is not protected against damage, in any change of objectives.

BRIEF STATEMENT OF THE INVENTION

The object of the invention is to provide an improved stereoscopic binocular microscope, (a) wherein the principal objective is common to the two observation-ray paths, (b) wherein the inner optical system of the microscope is protected at all times, and (c) wherein it is nevertheless possible to effect a rapid change of the focal length of the objective, thus avoiding disadvantages of known surgical microscopes.

The invention achieves this object by providing a principal objective which is rigidly attached to the microscope and by providing an additional lens system that is adapted to be swung into and out of the ray path, in front of the entrance surface of the principal objective.

In one embodiment of the invention, the lens system which is swingable in front of the principal objective is arranged for selective radial displacement in its mount.

The mount of the additional lens system is advantageously connected swingably to the mount of the principal objective.

The swinging of the lens system in front of the principal objective can be effected manually or by motor drive.

In one advantageous embodiment of the invention, the swingable lens system can be inserted into a protective pocket when not in use.

The advantages obtained by the invention consist, in particular, in the fact that the optical system of the surgical microscope is continuously closed by at least one lens system and is thus protected against external influences. Furthermore, the invention affords the possibility of displacing the image, if the lens system which is swingable in front of the principal objective is arranged for selective radial displacement. This radial displacement of the lens system replaces an expensive mechanical XY coupling if slight displacements are to be effected, as for example in operations on the human eye.

DETAILED DESCRIPTION

The invention will be described for a preferred embodiment, in conjunction with the accompanying drawings, in which.

Figure 1:
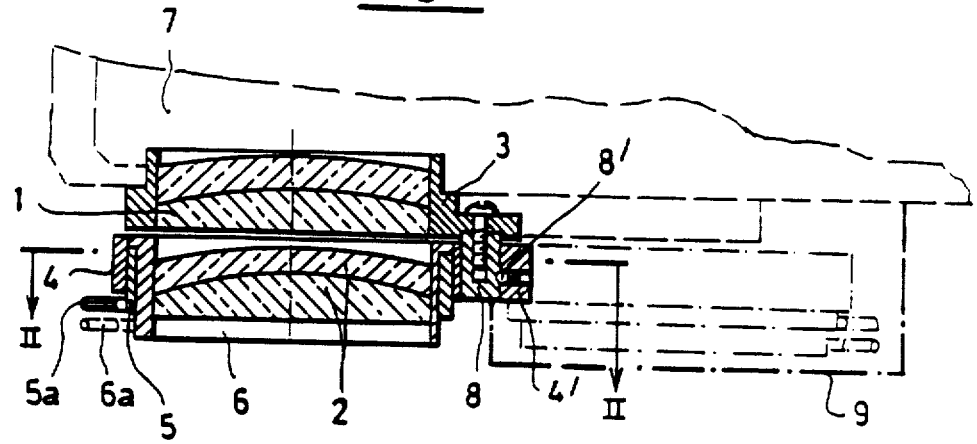
Figure 2:
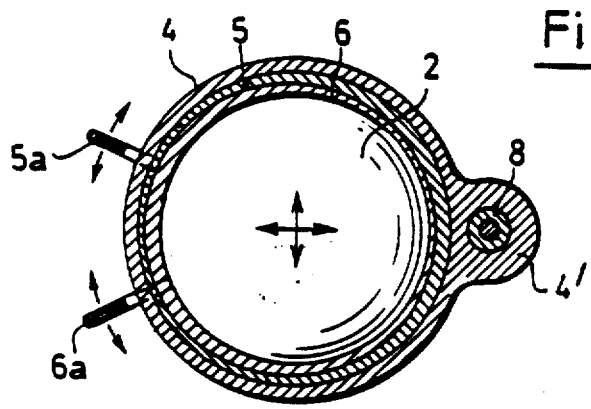
Figure 3:
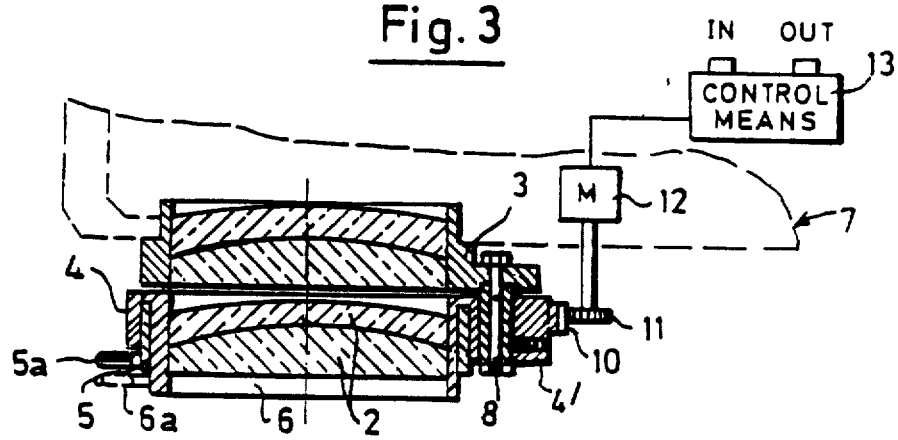

In FIG. 1, a fragment of the base body 7 of a stereoscopic binocular surgical microscope is shown in dashed lines, the same being broken away, above the principal objective 1, mounted by means 3 to the base body structure 7. Means 3 will be understood to provide a fixed mount for objective 1 and to physically close the microscope body against contaminating access to internal optical elements (not shown). The mount 4 of an additional lens system 2 is connected to mount 3 via a pivot pin 8. In the showing of FIG. 1, the additional lens system 2 has been swung into operative position in front of the principal objective 1; and detent means 8' is shown for snap location of this position. The position of lens system 2, when swung out of operating position, is shown in dash-dot lines. In this position, the lens system can be swung into a protective pocket of body 7, not shown in detail but suggested by heavy phantom outline 9 in FIG. 1.

Figure 1A:
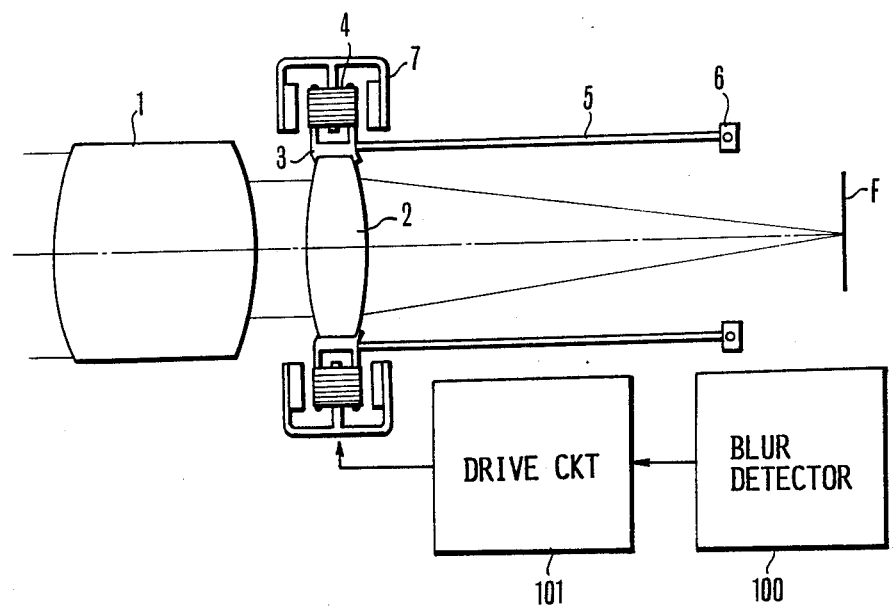
FIG. 1 is a vertical section through the principal objective of a surgical microscope of the invention, with an additional lens system swung into operative position in front of the principal objective, a fragment of supporting structure of the microscope being shown in dashed outline.
Figure 1B:
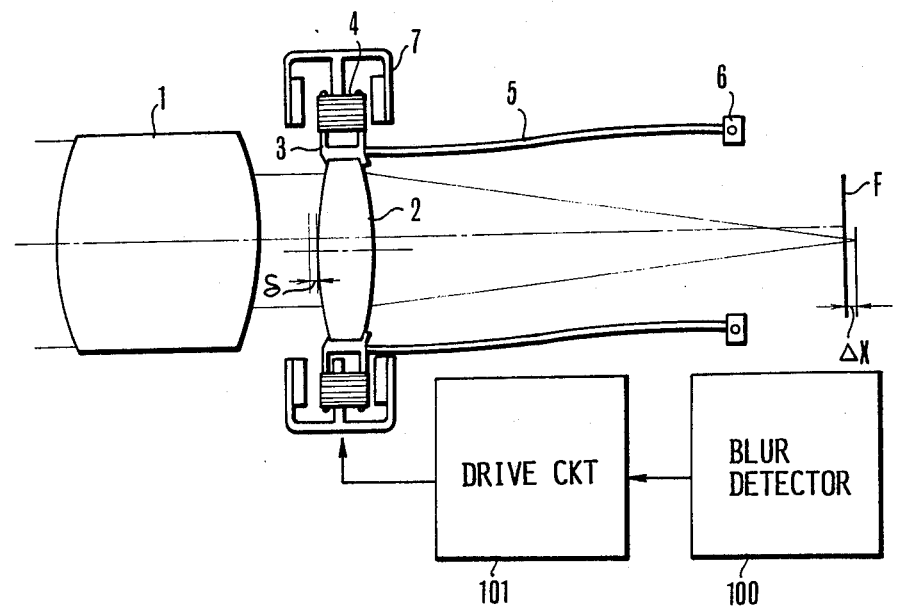
Figure 2:
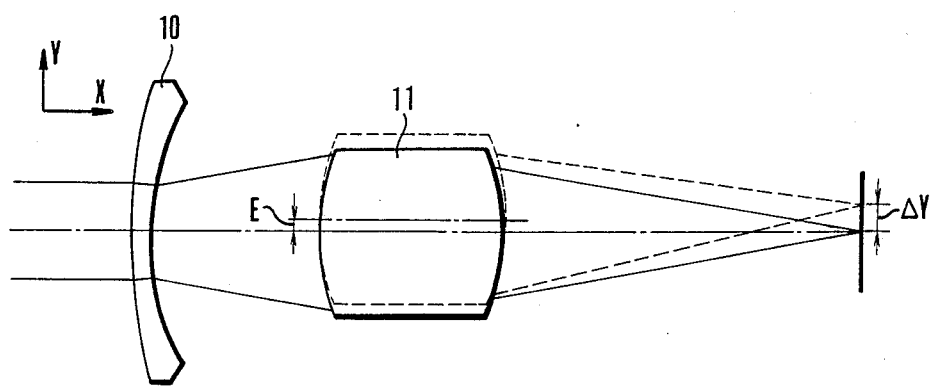
FIG. 2 is a section along the line II—II of the surgical microscope of FIG. 1.

FIG. 2 illustrates mechanism for selective radial displacement of lens system 2. To achieve radial displaceability, the lens system 2 is positioned via two independently adjustable eccentric rings 5, 6 within its mount 4. The eccentric 5 is displaced in rotation by means of an adjustment pin 5a, and the eccentric 6 is similarly but independently displaced by an adjustment pin 6a. The displacement effected thereby is sufficient for small ranges of radial displacement, such as are required, for example, in operations on the human eye, and such radial adjustment does not result in any noticeable impairment in the image.

Figure 3:
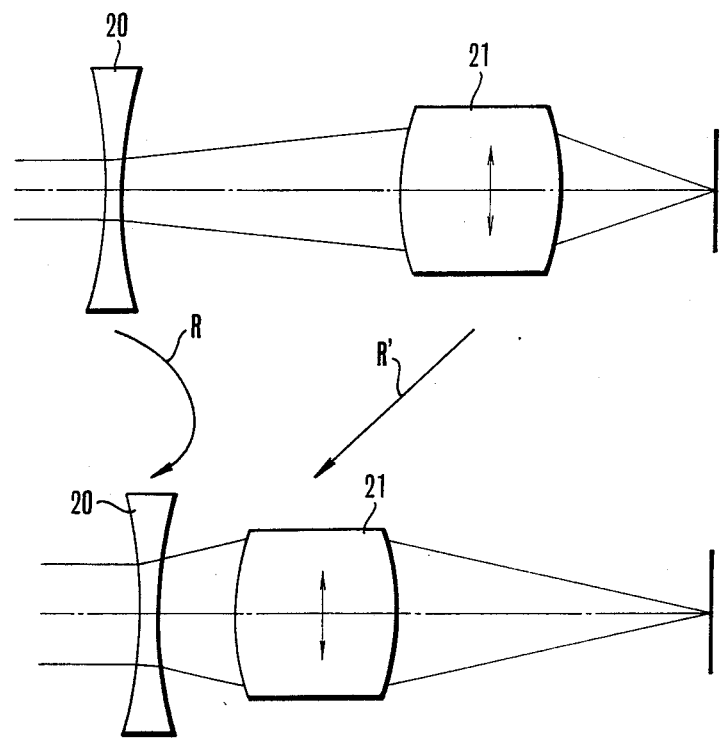
FIG. 3 is a view similar to FIG. 1 to show a modification.
Figure 4A:
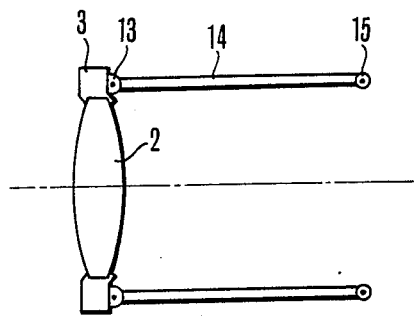
Figure 4B:
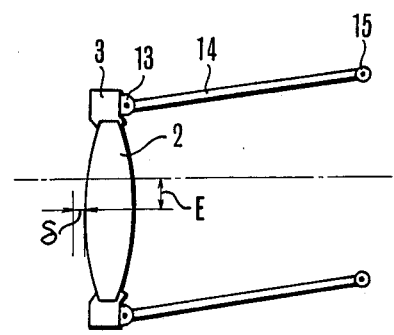
Figure 5:
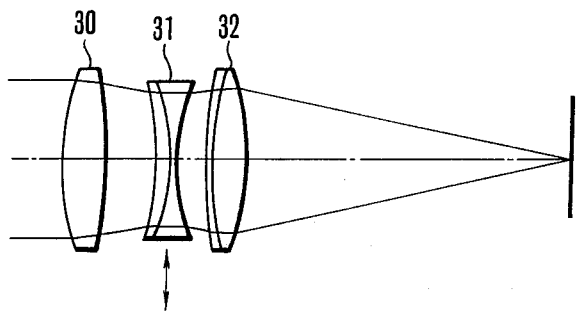
Figure 6:
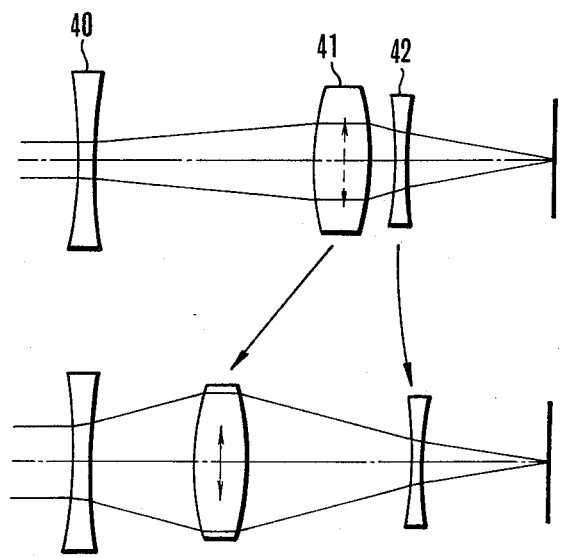

In the arrangement of FIG. 3, the arcuate hub 4' in which pivot 8 is centrally positioned is additionally provided with an arcuate succession of gear teeth 10 having edge-drive engagement with a motor-driven pinion 11, the motor 12 being mounted to the body 7 of the microscope. Control means 13 for motor 12 is schematically shown to include push buttons for in/out positioning drive of the additional lens system 2, with respect to the observation-ray paths of the microscope.

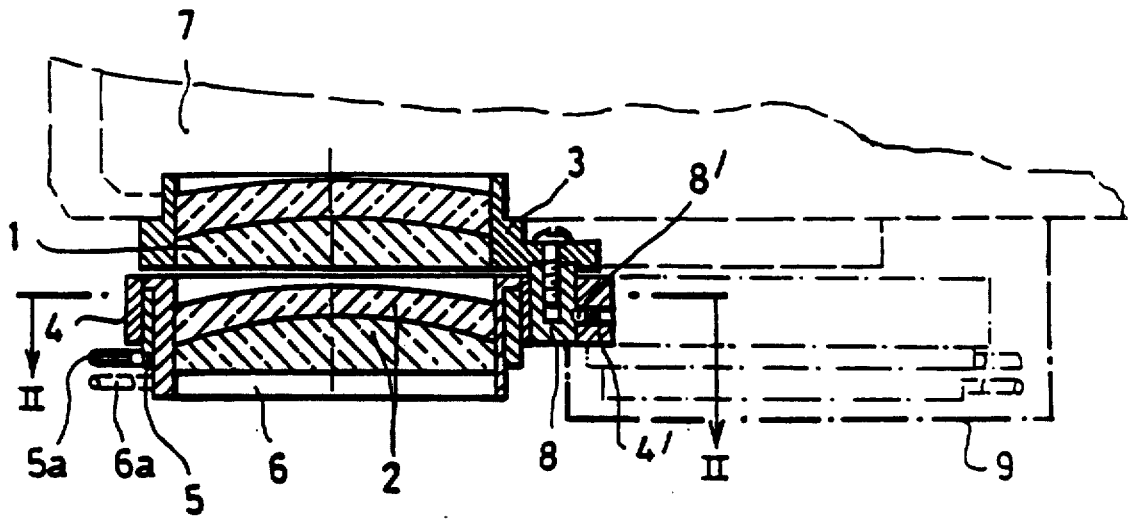

What is claimed is:

1. A stereoscopic binocular surgical microscope which has a principal objective of defined focal length which is rigidly attached to the microscope and is common to the two stereoscopic observation-ray paths of the microscope, characterized by the fact that the principal objective is rigidly mounted to the microscope and that an additional lens system is swingably connected to the mount of the principal objective and is adapted to be swung into and out of the ray path in front of the entrance surface of the principal objective, and a protective pocket mounted to the microscope and positioned to receive the additional lens system when swung out of the ray path and not in use.

2. A stereoscopic binocular surgical microscope according to claim 1, characterized by the fact that the additional lens system is arranged for radial displacement in its mount.

3. A stereoscopic binocular surgical microscope according to claim 1, characterized by the fact that the swinging of the lens system is effected manually.

4. A stereoscopic binocular surgical microscope according to claim 1, characterized by the fact that the swinging of the lens system is effected by motor means.

* * * * *

UNITED STATES PATENT AND TRADEMARK OFFICE
CERTIFICATE OF CORRECTION

PATENT NO. : 4,974,951

DATED : December 4, 1990

INVENTOR(S) : Ulrich Sander, et al

It is certified that error appears in the above-identified patent and that said Letters Patent is hereby corrected as shown below:

On the title page item [73] Assignee: should read as follows:

--Carl-Zeiss-Stiftung,
  Heidenheim/Brenz, d/b/a Carl Zeiss,
  Oberkochen, Federal Republic of Germany The title page should be deleted to appear as per attached title page.

Sheet 1 of 5 consisting of figures 1-6 should be deleted to be replaced with sheet 1 consisting of figures 1-3 as shown on the attached sheet.

Signed and Sealed this

Third Day of March, 1992

Attest:

HARRY F. MANBECK, JR.

Attesting Officer

Commissioner of Patents and Trademarks

United States Patent [19]

Sander et al.

[11] Patent Number: 4,974,951

[45] Date of Patent: Dec. 4, 1990

[54] SURGICAL MICROSCOPE WITH RAPID FOCAL-LENGTH CHANGER

[75] Inventors: Ulrich Sander; Kurt Schulz, both of Oberkochen, Fed. Rep. of Germany

[73] Assignee: Carl Zeiss, Oberkochen, Fed. Rep. of Germany

[21] Appl. No.: 409,883

[22] Filed: Sep. 20, 1989

[30] Foreign Application Priority Data

Sep. 26, 1988 [DE] Fed. Rep. of Germany ... 8812148[U]

[51] Int. Cl.⁵ ............................ G02B 7/02; G02B 3/00
[52] U.S. Cl. .................................. 350/520; 350/256; 350/409
[58] Field of Search ............... 350/520, 527, 519, 502, 350/510, 516, 247, 254, 256, 409; 351/212, 237

[56] References Cited

U.S. PATENT DOCUMENTS

| | | | |
|---|---|---|---|
| 1,717,755 | 6/1929 | Brady | 350/256 |
| 4,448,498 | 5/1984 | Muller et al. | 350/447 |

*Primary Examiner*—Bruce Y. Arnold
*Assistant Examiner*—James Phan
*Attorney, Agent, or Firm*—Hopgood, Calimafde, Kalil, Blaustein & Judlowe

[57] ABSTRACT

The invention contemplates a stereoscopic binocular surgical microscope wherein a principal objective of defined focal length is rigidly attached to the microscope and serves both observation-ray paths; an additional lens system is swingably positionable in and out of the ray paths for quick change of focal length, without changing the principal objective, and the additional lens system has provision for selective small radial adjustment of the axis of the additional lens system with respect to the axis of the principal objective, when in operative position.

4 Claims, 1 Drawing Sheet